United States Patent [19]
Didchenko et al.

[11] Patent Number: 5,167,796
[45] Date of Patent: Dec. 1, 1992

[54] METHOD OF FORMING AN ELECTRODE FROM A SULFUR CONTAINING DECANT OIL FEEDSTOCK

[75] Inventors: Rostislav Didchenko, Middleburg Heights; Irwin C. Lewis, Strongsville, both of Ohio

[73] Assignee: Ucar Carbon Technology Corporation, Danbury, Conn.

[21] Appl. No.: 355,833

[22] Filed: May 22, 1989

Related U.S. Application Data

[63] Continuation of Ser. No. 936,773, Dec. 2, 1986, abandoned, which is a continuation of Ser. No. 749,779, Jun. 28, 1985, abandoned, which is a continuation of Ser. No. 661,612, Oct. 17, 1984, abandoned, which is a continuation of Ser. No. 497,709, May 24, 1983, abandoned, which is a continuation of Ser. No. 279,096, Jun. 30, 1981, abandoned.

[51] Int. Cl.$^5$ ............................................. C10G 69/02
[52] U.S. Cl. ......................................... 208/89; 208/50; 208/131; 208/216 PP; 208/251 H
[58] Field of Search ................. 208/216 PP, 50, 131, 208/89, 251 H

[56] References Cited

U.S. PATENT DOCUMENTS

| | | | |
|---|---|---|---|
| 2,871,182 | 1/1959 | Weekman, Jr. | 208/50 |
| 2,963,416 | 12/1960 | Ward et al. | 208/50 |
| 3,112,181 | 11/1963 | Petersen et al. | 208/50 |
| 3,624,231 | 9/1969 | Juel | 106/307 |
| 3,817,853 | 6/1974 | Folkins | 208/50 |
| 3,876,523 | 4/1975 | Rosinski et al. | 208/89 X |
| 3,891,538 | 6/1975 | Walkey | 208/50 |
| 3,907,668 | 9/1975 | Christman et al. | 208/216 PP |
| 3,923,635 | 12/1975 | Schulman et al. | 208/50 |
| 3,976,561 | 8/1976 | Eyles | 208/216 PP |
| 4,075,084 | 2/1977 | Skripek et al. | 208/93 |
| 4,166,026 | 7/1978 | Fukni et al. | 208/210 |
| 4,176,046 | 11/1979 | McConaghy, Jr. | 208/50 |
| 4,177,163 | 12/1979 | Oleck et al. | 208/216 PP |
| 4,178,229 | 12/1979 | McConaghy, Jr. | 208/50 |
| 4,213,846 | 7/1980 | Sooter et al. | 208/50 |
| 4,224,144 | 9/1980 | Hensley, Jr. et al. | 208/216 PP |
| 4,267,033 | 5/1981 | Heck et al. | 208/216 PP |

FOREIGN PATENT DOCUMENTS

| | | | |
|---|---|---|---|
| 0225805 | 11/1958 | Australia | 208/50 |
| 0083143 | 7/1983 | European Pat. Off. | 208/50 |

*Primary Examiner*—Anthony McFarlane
*Attorney, Agent, or Firm*—F. J. McCarthy

[57] ABSTRACT

A premium coke is produced from a decant oil resulting from the catalytic cracking of petroleum oil by selectively hydrodesulfurizing the decant oil and then subjecting the hydrodesulfurized decant oil to delayed coking.

7 Claims, 1 Drawing Sheet

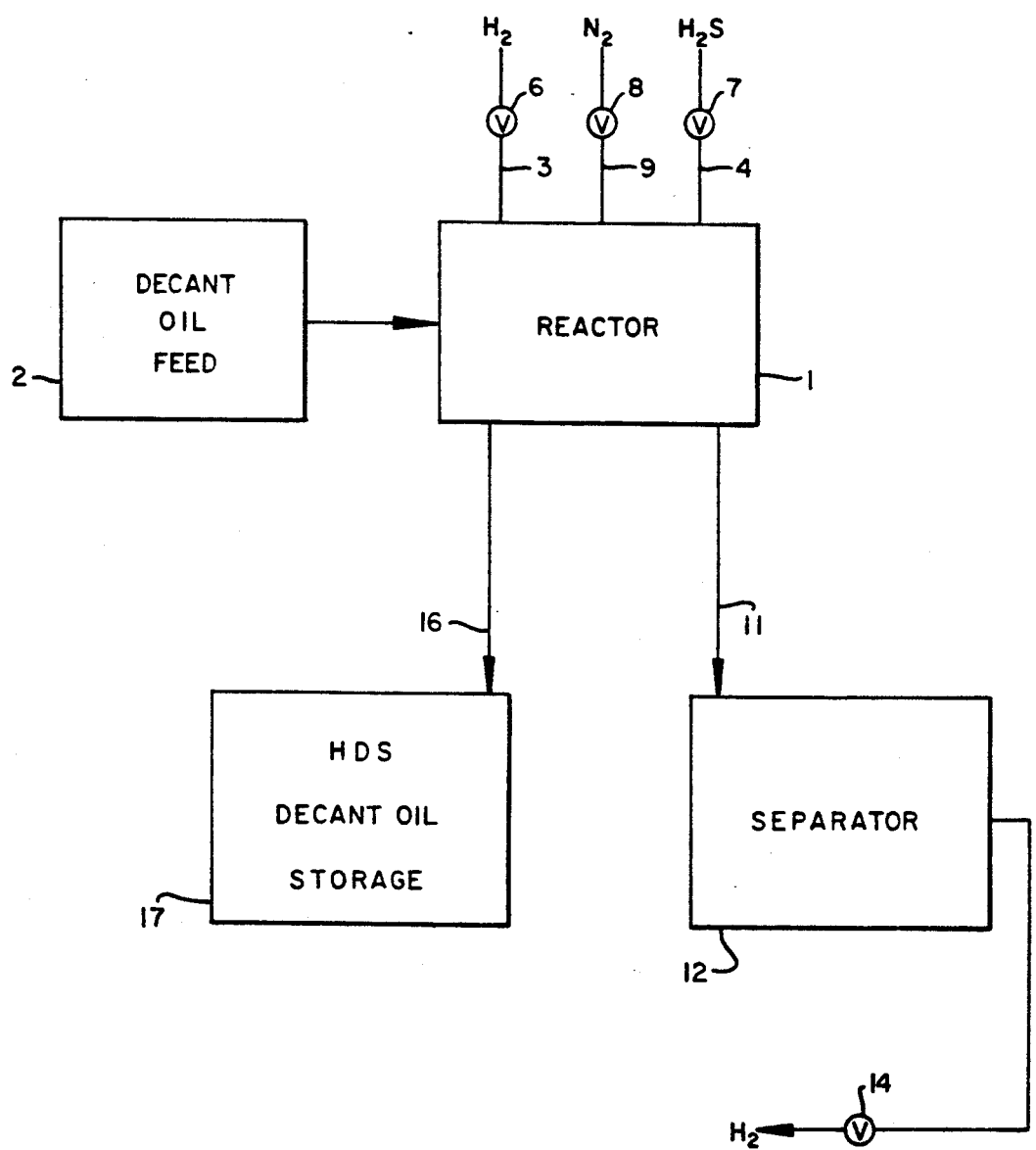

METHOD OF FORMING AN ELECTRODE FROM A SULFUR CONTAINING DECANT OIL FEEDSTOCK

This application is a continuation of prior U.S. application Ser. No. 936,773, filing date Dec. 2, 1986, now abandoned, which is a continuation of application Ser. No. 749,779, filing date Jun. 28, 1985, now abandoned, which is a continuation of application Ser. No. 661,612, filing date Oct. 17, 1984, now abandoned, which is a continuation of application Ser. No. 497,709, filing date May 24, 1983, now abandoned, which is a continuation of Ser. No. 279,096, now abandoned.

BACKGROUND OF THE INVENTION

The invention relates to a method of making a premium coke and particularly to making a premium coke suitable for the commercial production of electrodes used in the melting of steel.

It is well known to use low sulfur-decant oil resulting from the catalytic cracking of petroleum to produce premium coke using delayed coking. It is known in the art that in order to produce high quality electrodes suitable for the production of steel, the coke should be so-called "needle coke" and should not contain very much sulfur. Sometimes, the needle coke is referred to as "premium coke" or "premium needle coke".

Needle coke results in an electrode possessing a low coefficient of thermal expansion (CTE) which is necessary to use the electrodes at the elevated temperatures present during the production of steel.

The low sulfur content of the premium coke is important because the commercial processes for graphitizing the electrodes include a rapid increase in temperature. Sulfur in the coke is vaporized during graphitization and the resulting internal pressure can damage the electrode. The phenomenom is commonly called "puffing".

It is a common practice to use an inhibitor to reduce puffing in the coke. There are, however, limitations on the effectiveness of the inhibitors for coke having a sulfur content of more than a given level, as determined by the rate of temperature increase and other factors.

The inhibitors are inorganic compounds and the amount of the inhibitor is limited due to the deleterious effects on the properties of the electrodes.

U.S. Pat. No. 3,624,231 to Juel et al discusses puffing in coke and the use of inhibitors.

Decant oils having less than about 1% by weight sulfur are used in prior art methods for making low sulfur premium coke using delayed coking.

It has now been determined that the critical criterion is that the premium coke should have less than about 0.8% by weight sulfur to be suitable for the commercial production of electrodes.

Because of strong demands in other commercial markets, low sulfur decant oils are becoming unavailable for the economical production of premium coke.

The invention is directed to decant oils having sulfur contents of more than about 1% by weight and generally at least about 1.5% by weight. These decant oils can contain as much as about 4% by weight although decant oils having the higher amounts are not desirable.

The instant applicants have discovered that because the sulfur content in the decant oil is distributed throughout the various molecules from the low weight molecules to the heavy weight molecules, the prior art desulfurization of decant oil is ineffective for producing low sulfur premium coke. The applicants found that the primary action of the prior art of reducing the sulfur content of a decant oil is the removal of sulfur from the low weight molecules and the coke produced by the delayed coking is primarily derived from the heaviest molecules. That is, the low weight molecules are volatilized off. As a result of this, a decant oil which has been treated according to the prior art will produce a coke having a higher sulfur content by weight than the instant hydrodesulfurized decant oil.

The applicants have realized that the hydrodesulfurization should be directed to the heavy molecules because the low molecules containing sulfur are vaporized off with their respective sulfur during the delayed coking.

SUMMARY OF THE INVENTION

In its broadest embodiment, the invention is directed to a method of producing a low sulfur premium coke from a high sulfur decant oil resulting from the catalytic cracking of petroleum and features the steps of hydrodesulfurizing the decant oil with a catalyst having relatively large pores in order to be effective for removing sulfur from the heavier molecules of the decant oil, and delayed coking the hydrodesulfurized decant oil to produce the premium coke.

Preferably, the premium coke should contain less than about 0.8% by weight sulfur in order to provide a quality feedstock for the production of electrodes. It is implicit that the hydrodesulfurization must have parameters in conjunction with the delayed coking to produce the preferred premium coke.

As used herein, "high sulfur decant oil" is a decant oil containing at least about 1% by weight to about 4% by weight sulfur, and preferably from about 1.5% to about 2.5% by weight sulfur.

The term "delayed coking" used herein refers to the conventional process generally identified by that designation.

The preferred embodiment of the invention produces low sulfur coke from high sulfur decant oil resulting from the catalytic cracking of petroleum, and features the steps of selectively hydrodesulfurizing the decant oil with hydrogen and a porous catalyst at a temperature of from about 340° C. to about 450° C. at a reactor pressure of from about 500 psig to about 3000 psig and a space velocity for the decant oil being from about 0.1 to about 10 hour$^{-1}$; and delayed coking the hydrodesulfurized decant oil to produce the premium coke.

The composition of the catalyst is as follows. The catalyst comprises a hydrogenation component of at least one Group VIB metal component and at least one Group VIII metal component on a refractory oxide support. The Groups VI and VIII referred to herein are the groups of the Periodic Table of Elements. A preferred catalyst comprises the oxide or sulfide of a Group VIB metal and the oxide or sulfide of a Group VIII metal deposited upon a support material comprising a silica-stabilized alumina containing 1% to 6% by weight silica. The active metallic components in the preferred catalyst for the Group VIB oxide or sulfide is selected from the group consisting of molybdenum or tungsten such as molybdenum oxide, molybdenum sulfide, tungsten oxide, tungsten sulfide, and mixtures thereof. Similarly, the preferred Group VIII oxide or sulfide is selected from the group consisting of nickel or cobalt oxide or sulfide such as nickel oxide, cobalt oxide, nickel sulfide, cobalt sulfide, and mixtures thereof.

The most preferred metal components are nickel oxide with molybdenum oxide and cobalt oxide with molybdenum oxide.

The methods for preparing these catalysts are disclosed in U.S. Pat. Nos. 3,770,618 and 3,509,044. The teachings of these patents are incorporated herein.

The distribution of pore diameters for the catalyst is critical for obtaining the selective hydrodesulfurization in accordance with the invention. At least 80% of the pore diameters must be greater than about 70 Angstroms because the removal of sulfur from the larger molecules can only be accomplished effectively by the use of relatively larger pore diameters. Preferably, 80% of the pore diameters are greater than about 170 Angstroms. Nevertheless, a considerable amount of hydrodesulfurization occurs for the decant oil molecules in the medium to low molecular weight range.

The amount of hydrogen reacted in the instant process or "hydrogen consumption" depends on many factors besides the decant oil. Some of these factors are the reactor temperature, the catalyst composition, the pore diameter distribution, and the catalyst particle sizes. The hydrogen should be supplied at a sufficient rate to maintain the reactor pressure at a predetermined level.

In commercial practice, the hydrogen would be supplied at a rate which considerably exceeded the rate of hydrogen consumption. The unreacted hydrogen would be separated from the gases removed from the reactor and recycled into the reactor.

The economy of the operation of the instant process is strongly dependent on the hydrogen consumption.

In accordance with the prior art, the catalyst should be activated using a mixture of hydrogen and hydrogen sulfide.

The laboratory reactor for carrying out the invention operated in a trickle-bed mode with the decant oil entering at the top. The catalyst was diluted with quartz chips (12/16 mesh) to vary the residence time. Typically, 100 ml of catalyst was diluted with 200 ml of quartz chips.

The operating parameters of the hydrodesulfurizing process are:
1. Temperature of the catalyst,
2. Residence time over the catalyst,
3. Hydrogen/feed ratio, and
4. Reactor pressure.

Generally, as the operating temperature increases, hydrodesulfurization increases, hydrodenitrogenation increases, and hydrocracking increases to a maximum and then decreases.

Extensive hydrogenation is undesirable for decant oils to be used in coking because it reduces the coke yield. Hydrogenation can be minimized by operating at temperatures above 370° C. Hydrocracking becomes noticeable for temperatures above about 400° C. and results in undesirable carbon deposits on the catalyst surface. High pressures impede the carbonization. To maintain a long catalyst life, temperatures above 420° C. are generally avoided.

The residence time is measured as the reciprocal of the space velocity which is defined as:

$$SV = \frac{\text{Volume feedstock per unit time}}{\text{Volume of the catalyst}}$$

The quartz chips used in conjunction with the catalyst are not considered as part of the volume of the catalyst.

For liquid feeds, the term "liquid hourly space velocity" (LHSV) is commonly used and expressed in units of $\text{hour}^{-1}$. This measurement provides a convenient means of comparison for different feedstocks under various conditions of a trickle bed reactor.

Catalyst temperature and space velocity are the most important process variables that determine the reaction rate.

Large hydrogen/feed ratios and high pressures work to maintain catalyst activity over a long period of time. A large excess of hydrogen is preferably maintained in the reactor, particularly with heavy feedstocks which are only partially vaporized at the operating temperatures.

Above some minimum value, the hydrogen/feed ratio has little effect on the desulfurization process.

In addition, both the operating temperature and pressure are independent of the sulfur content of the decant oil.

Generally, the operating temperature range is from about 340° C. to about 450° C. and preferably from about 370° C. to about 420° C.

The space velocity can be from about 0.1 to about 10 $\text{hours}^{-1}$ but preferably from about 1 to about 3 $\text{hours}^{-1}$.

The hydrogen feed ratio is generally from about 300 to about 12,000 scf/bbl while the typical hydrogen consumption is from about 200 to about 1000 scf/bbl. The hydrogen which is not consumed is recovered and recycled in a commercial embodiment.

The reactor pressure can range from about 500 to about 3000 psig and preferably from about 750 to about 1500 psig.

For a fuller understanding of the nature and objects of the invention, reference should be had to the detailed description, taken in connection with the accompanying drawing, in which:

BRIEF DESCRIPTION OF THE DRAWINGS

The FIGURE is a simplified flow sheet of the catalytic unit used to carry out the hydrodesulfurization according to the invention.

Illustrative, non-limiting examples of the practice of the invention are set out below. Numerous other examples can readily be evolved in the light of the guiding principles and teachings contained herein. The examples given herein are intended to illustrate the invention and not in any sense to limit the manner in which the invention can be practiced.

The catalysts used in the examples are described in Table 1:

TABLE 1

| | Catalysts | | | |
|---|---|---|---|---|
| | A | B | C | D |
| Composition | 5% CoO | 5% CoO | 4.3% CoO | 4.7% CoO |
| | 15% $MoO_3$ | 15° $MoO_3$ | 13.4% $MoO_3$ | 14.8% $MoO_3$ |
| | 80% $\gamma$-$Al_2O_3$ | 80% $\gamma$-$Al_2O_3$ | 82.3% $\gamma$-$Al_2O_3$ | 80.5% $\gamma$-$Al_2O_3$ |

TABLE 1-continued

|  | Catalysts | | | |
| --- | --- | --- | --- | --- |
|  | A | B | C | D |
| Bulk Density (Mg/m$^3$) | 0.79 | 0.73 | 0.72 | 0.59 |
| Surface Area (M$^2$/g) | 170 | 250 | 132 | 157 |
| Pore Volume (cc/g) | 0.49 | 0.55 | 0.55 | 0.73 |
| Mean Pore Diameter (A°) | 90 | 90 | 142 | 195 |
| Pore Diameter Distribution by Pore Volume (Mercury Penetration Porosimeter Model 904-4 from Micrometrics Corp. Using Hg Contact Angle of 130° | 20% <80 Å  50% 80 Å-100 Å  30% >100 Å | 20% <70 Å  50% 70 Å-125 Å  30% >125 Å | 20% <102 Å  56% 119 Å-153 Å  6% >170 Å | 20% <170 Å  50% 170 Å-300 Å  30% >300 Å |
| 80% Pore Diameters Exceed | 80 Å | 70 Å | 102 Å | 170 Å |

DETAIL DESCRIPTION OF THE INVENTION

The FIGURE shows a simplified flow sheet of the system for carrying out the invention. A reactor 1 comprises a stainless steel tube having an inside diameter of 32 mm and is heated with a resistance furnace (not shown). The reactor 1 operates in a trickle-bed mode with the decant oil from a decant oil feed 2 entering from the top.

The catalyst in the reactor 1 amounts to 100 ml and is diluted with 200 ml of quartz chips (12/16 mesh) and loaded into the stainless steel tube. The resulting catalyst bed is 370 mm long.

A fresh catalyst bed is activated with hydrogen and hydrogen sulfide which are supplied through lines 3 and 4 and controlled by valves 6 and 7.

The nitrogen supplied by line 9 and controlled by valve 8 is used to purge the catalyst of any dissolved hydrogen sulfide.

Gases from the reactor 1 are removed over line 11 to a separator 12 and recovered hydrogen is removed over line 13 through valve 14. Hydrodesulfurized (HDS) decant oil is removed from the reactor 1 over line 16 to storage 17.

EXAMPLES 1 to 3

Examples 1 to 3 were carried out with a decant oil having a sulfur content of about 2.35% by weight and catalyst A.

Example 1 processed the decant oil to a coke and then an electrode without hydrodesulfurization while Examples 2 and 3 included hydrodesulfurization using catalyst A. The sulfur contents after hydrodesulfurization for the Examples 2 and 3 were 1.04% and 0.79% by weight.

Table 2 shows the results of the Examples 2 and 3 as compared to the Example 1. The coking was carried out by the delayed coking process and the electrode was made from the coke using a commercial process. The same amount of weight of puffing inhibitor was used in these examples as well as in all of the subsequent examples.

It can be seen in the Examples 2 and 3 that the sulfur content expressed as weight percent increased after coking as compared to prior to coking. That is, 1.04% and 0.79% increased to 1.27% and 0.93% respectively. This is due to the loss of low molecular weight molecules which have been desulfurized substantially due to the catalyst.

TABLE 2

|  | Catalyst A | | |
| --- | --- | --- | --- |
| Parameter | Ex. 1 | Ex. 2 | Ex. 3 |
| Temperature | — | 363° C. | 391° C. |

TABLE 2-continued

|  | Catalyst A | | |
| --- | --- | --- | --- |
| Parameter | Ex. 1 | Ex. 2 | Ex. 3 |
| Residence Time Hr.$^{-1}$ | — | 2.0 | 2.0 |
| H$_2$/feed Ratio | — | 1000 | 1000 |
| Reactor Pressure, psig. | — | 750 | 750 |
| % S (prior to coking) | 2.35 | 1.04 | 0.79 |
| Atomic C/H | 0.91 | 0.84 | 0.86 |
| Coke Yield %, 1000° C. | 41 | 29 | 31 |
| % S (1000° C.) | 2.1 | 1.27 | 0.93 |
| Puffing (With Inhibitor) | Unacceptable | Unacceptable | Unacceptable |
| CTE, 10$^{-6}$/°C. | 0.37 | 0.32 | 0.32 |

EXAMPLES 4 AND 5

Examples 4 and 5 were carried out with the same decant oil as in the Examples 1 to 3 except that the hydrodesulfurization was with the catalyst B. The electrodes were made by the same process.

Table 3 shows the results of the Examples 4 and 5.

TABLE 3

|  | Catalyst B | |
| --- | --- | --- |
| Parameter | Ex. 4 | Ex. 5 |
| Temperature | 371° C. | 390° C. |
| Residence Time Hr.$^{-1}$ | 2.0 | 2.0 |
| H$_2$/feed Ratio | 1000 | 1000 |
| Reactor Pressure, psig. | 750 | 750 |
| % S (prior to coking) | 0.82 | 0.63 |
| Atomic C/H | 0.83 | 0.84 |
| Coke Yield %, 1000° C. | 27 | 28 |
| % S (1000° C.) | 0.95 | 0.71 |
| Puffing (With Inhibitor) | Unacceptable | Acceptable |

EXAMPLES 6 TO 8

Examples 6 to 8 were carried out with the same decant oil as in the Examples 1 to 3 except that the hydrodesulfurization was with the catalyst C. The electrodes were made by the same process.

Table 4 shows the results of the Examples 6 to 8.

TABLE 4

|  | Catalyst C | | |
| --- | --- | --- | --- |
| Parameter | Ex. 6 | Ex. 7 | Ex. 8 |
| Temperature | 391° C. | 411° C. | 425° C. |
| Residence Time Hr.$^{-1}$ | 2.0 | 2.0 | 2.0 |
| H$_2$/feed Ratio | 1000 | 1000 | 1000 |
| Reactor Pressure, psig. | 750 | 750 | 750 |
| % S (prior to coking) | 0.63 | 0.51 | 0.42 |
| Atomic C/H | 0.83 | 0.84 | 0.87 |
| Coke Yield %, 1000° C. | 30 | 31.5 | 31.5 |
| % S (1000° C.) | 0.63 | 0.50 | 0.48 |
| Puffing (With Inhibitor) | Acceptable | Acceptable | Acceptable |
| CTE, 10$^{-6}$/°C. | — | — | — |

EXAMPLES 9 TO 12

Examples 9 to 12 were carried out with the same decant oil as in the Examples 1 to 3 except that the hydrodesulfurization was with the catalyst D. The electrodes were made by the same process.

Table 5 shows the results of Examples 9 to 12.

TABLE 5

| | Catalyst D | | | |
|---|---|---|---|---|
| Parameter | Ex. 9 | Ex. 10 | Ex. 11 | Ex. 12 |
| Temperature | 363° C. | 391° C. | 414° C. | 414° C. |
| Residence Time Hr.$^{-1}$ | 2.0 | 2.0 | 2.0 | 1.0 |
| H$_2$/feed Ratio | 1000 | 1000 | 1000 | 1000 |
| Reactor Pressure, psig. | 750 | 750 | 750 | 750 |
| % S (prior to coking) | 1.26 | 0.91 | 0.79 | 0.58 |
| Atomic C/H | 0.85 | 0.85 | 0.91 | 0.85 |
| Coke Yield %, 1000° C. | 32 | 31.5 | 33.5 | 32.5 |
| % S (1000° C.) | 1.43 | 1.08 | 0.88 | 0.70 |
| Puffing (With Inhibitor) | Unacceptable | Unacceptable | Acceptable | Acceptable |
| CTE, 10$^{-6}$/°C. | — | — | 0.31 | 0.31 |

EXAMPLES 13 AND 14

Examples 13 and 14 were carried out using a decant oil having a sulfur content of about 1.12% by weight. The hydrodesulfurization was carried out using catalyst A.

Table 6 shows the results of Examples 13 and 14.

TABLE 6

| | Catalyst A | |
|---|---|---|
| Parameter | Ex. 13 | Ex. 14 |
| Temperature | 346° C. | 357° C. |
| Residence Time Hr.$^{-1}$ | 2.02 | 3.0 |
| H$_2$/feed Ratio | 1060 | 1090 |
| Reactor Pressure, psig. | 757 | 763 |
| % S (prior to coking) | 0.76 | 0.50 |
| Atomic C/H | 0.93 | 0.89 |
| Coke Yield %, 1000° C. | 32 | 30 |
| % S (1000° C.) | 0.65 | 0.50 |
| Puffing (With Inhibitor) | Acceptable | Acceptable |
| CTE, 10$^{-6}$/°C. | 0.32 | 0.28 |

Without hydrodesulfurization, the decant oil had an atomic C/H of 0.98 and the coke yield for a 1000° C. heat treatment of delayed coking was 35%. The electrode had a CTE of 0.35 10$^{-6}$/°C. but the puffing was unacceptable.

DISCUSSION OF EXAMPLES

The examples show the guidelines for carrying out the instant invention.

It can be seen that the hydrodesulfurization dearomatizes the decant oils as evident from the decrease in C/H. This is expected and would discourage in general the use of hydrodesulfurization in a process for producing premium coke for electrodes because dearomatizing is expected to result in high values of CTE. Surprisingly, the measured values of CTE for the electrodes produced according to the invention showed excellent values of CTE and the Examples 13 and 14 showed improvements in the values of CTE as compared to electrodes made from untreated decant oil.

Generally, it has been found that the use of high reaction temperatures, from about 370° C. to about 420° C. tend to minimize hydrogen consumption and to improve coke yield as well as to minimize the dearomatization.

The coke yield was best for the catalyst having the largest mean pore diameter as well as the highest number of large pores, 80% of the pore diameters exceeded 170 Angstroms.

We wish it to be understood that we do not wish to be limited to the exact details shown and described because obvious modifications will occur to a person skilled in the art.

Having thus described the invention, what we claim as new and desire to be secured by Letters patent is as follows:

1. A method of forming an electrode for use in melting steel from a high sulfur decant oil feedstock derived from the catalytic cracking of petroleum, said decant oil feedstock containing a high content of aromatic hydrocarbons with high and low molecular weight fractions consisting essentially of the steps of: hydrotreating all of the decant oil feedstock directly with hydrogen and a porous catalyst having at least about 80% of its pores with diameters greater than about 102 Angstroms so as to preferentially hydrodesulfurize the higher molecular weight aromatic fraction of said decant oil; delayed coking said hydrodesulfurized decant oil for producing premium coke and forming said electrode from said premium coke.

2. The method of claim 1, wherein said decant oil has a sulfur content of from about 1.0% to about 4.0% by weight and said premium coke has a sulfur content of less than about 0.8% by weight.

3. The method of claim 1, wherein said decant oil has a sulfur content of from about 1.5% to about 2.5% by weight and said premium coke has a sulfur content of less than about 0.8% by weight.

4. A method of forming an electrode for use in melting steel from high sulfur decant oil feedstock derived from the catalytic cracking of petroleum, said decant oil feedstock containing a high content of aromatic hydrocarbons with high and low molecular weight fractions, consisting essentially of the steps of: hydrotreating all of the decant oil feedstock directly with hydrogen and a porous catalyst having a mean pore diameter of less than about 200 Angstroms with at least about 80% of its pores with diameters greater than about 170 Angstroms at a temperature of from about 340° C. to about 450° C. at a reactor pressure of from about 500 psig to about 3000 psig and a space velocity for the decant oil being from about 0.1 to about 10 hour$^{-1}$ so as to preferentially hydrodesulfurize the higher weight aromatic fraction of said decant oil; delayed coking the hydrodesulfurized decant oil for producing premium coke and forming said electrode from said premium coke.

5. A method of forming an electrode for use in melting steel from high sulfur decant oil resulting from the catalytic cracking of petroleum, said decant oil having a sulfur content of from about 1.0% to about 4.0% by weight and containing both high molecular weight and low molecular weight fractions, consisting essentially of the steps of hydrodesulfurizing at least the high molecular weight fractions of all of said decant oil with hydrogen and a porous catalyst having a surface area of from about 132 to about 250 square meters per gram and having a mean pore diameter of less than about 200 Angstroms with at least about 80% of its pores having diameters greater than about 170 Angstroms at a temperature of about 340° C. to about 450° C. at a reactor pressure from about 500 psig to about 3000 psig and a space velocity for the decant oil being from about 0.1 to about 10 hour$^{-1}$, delayed coking the hydrodesulfurized decant oil to produce a premium coke having a sulfur content of less than 0.8% by weight, and forming said electrode from said premium coke.

6. The method of claim 5, wherein said decant oil has a sulfur content of from about 1.5% to about 2.5% by weight.

7. A method of forming an electrode for use in melting steel from high sulfur decant oil resulting from the catalytic cracking of petroleum, said decant oil having a sulfur content of from about 1.0% to about 4.0% by weight and containing both high molecular weight and low molecular weight fractions, consisting essentially of the steps of hydrodesulfurizing all of said decant oil with hydrogen and a porous catalyst having a mean pore diameter of less than about 200 Angstroms with at least about 80% of its pores having diameters greater than about 102 Angstroms at a temperature of from about 340° C. to about 450° C. at a reactor pressure from about 500 psig to about 3000 psig and a space velocity for the decant oil being from about 0.1 to about 10 hour$^{-1}$, delayed coking the hydrodesulfurized decant oil to produce a premium coke having a sulfur content of less than about 0.8% by weight and forming said electrode from said premium coke.

* * * * *